United States Patent
Hammes et al.

(10) Patent No.: US 11,558,729 B2
(45) Date of Patent: Jan. 17, 2023

(54) SAFETY SYSTEM AND METHOD

(71) Applicant: SICK AG, Waldkirch (DE)

(72) Inventors: Markus Hammes, Waldkirch (DE); Christoph Hofmann, Waldkirch (DE)

(73) Assignee: SICK AG, Waldkirch (DE)

( * ) Notice: Subject to any disclaimer, the term of this patent is extended or adjusted under 35 U.S.C. 154(b) by 24 days.

(21) Appl. No.: 17/148,929

(22) Filed: Jan. 14, 2021

(65) Prior Publication Data

US 2021/0227372 A1 Jul. 22, 2021

(30) Foreign Application Priority Data

Jan. 22, 2020 (DE) .......................... 102020101482.1

(51) Int. Cl.
| | |
|---|---|
| *H04M 11/04* | (2006.01) |
| *H04W 24/00* | (2009.01) |
| *H04W 4/90* | (2018.01) |
| *H04W 4/38* | (2018.01) |
| *H04W 4/029* | (2018.01) |
| *H04W 4/02* | (2018.01) |

(52) U.S. Cl.
CPC ............. *H04W 4/90* (2018.02); *H04W 4/023* (2013.01); *H04W 4/029* (2018.02); *H04W 4/38* (2018.02)

(58) Field of Classification Search
CPC ......... H04W 4/90; H04W 4/38; H04W 4/029; H04W 4/023
See application file for complete search history.

(56) References Cited

U.S. PATENT DOCUMENTS

| 8,717,180 B2 | 5/2014 | Granhed et al. |
| 2005/0207618 A1* | 9/2005 | Wohler .................. B25J 9/1697 |
| | | 382/103 |
| 2013/0278416 A1 | 10/2013 | Button et al. |

(Continued)

FOREIGN PATENT DOCUMENTS

| DE | 4340756 A1 | 6/1994 |
| DE | 102014219165 A1 | 4/2016 |

(Continued)

OTHER PUBLICATIONS

Examination Report dated Jan. 14, 2021 issued in corresponding German Application No. 10 2020 101 482.1.

*Primary Examiner* — Erika A Washington
(74) *Attorney, Agent, or Firm* — Nath, Goldberg & Meyer; Jerald L. Meyer

(57) ABSTRACT

A safety system for localizing a person or object has a control and evaluation unit, at least one radio location system, and at least one spatially resolving sensor for the position determination of the person or object. The radio location system has arranged radio stations, wherein at least one radio transponder is arranged at the person or object. Position data and classification data of the person or object can be determined by means of the radio location system. The position data and the classification data can be transmitted from the radio station to the control and evaluation unit and position data and contour data of the person or object can be determined by means of the spatially resolving sensor. The control and evaluation unit is configured to compare the position data of the radio location system and the position data of the spatially resolving sensor.

10 Claims, 5 Drawing Sheets

(56) References Cited

U.S. PATENT DOCUMENTS

| | | | |
|---|---|---|---|
| 2015/0049911 A1* | 2/2015 | Doettling | G06V 10/255 |
| | | | 382/103 |
| 2017/0287332 A1 | 10/2017 | Ranninger Hernandez et al. | |
| 2019/0118705 A1 | 4/2019 | Yu et al. | |

FOREIGN PATENT DOCUMENTS

| | | |
|---|---|---|
| DE | 102016208808 A1 | 11/2017 |
| DE | 102016217531 A1 | 3/2018 |
| DE | 102016217532 A1 | 3/2018 |
| EP | 3279688 A1 | 2/2018 |

\* cited by examiner

SAFETY SYSTEM AND METHOD

FIELD

The present invention relates to a safety system for localizing a person or an object and to a method of localizing a person or an object.

BACKGROUND

The sensor system of functional safety has currently reached a level that basic physical features of the environment, for example geometrical information such as distances, lengths, or the presence of objects per se can be reliably detected and used in simple safety functions. In contrast, higher value information or derived meanings, for example the information on what type of object it is, are as a rule not reliably detectable by sensors and are therefore also not usable from a safety engineering aspect.

In this sense, in particular the information whether it is an object or a person or not is of interest for higher value safety functions. This safe object classification has previously not been able to be implemented, but is very important with respect to the situation-relevant control of the machine. An object classification is generally already a very complex process since as a rule image data have to be used for this purpose that then have to be processed in a very laborious manner. This as a rule produces expensive sensors frequently having substantial latency times.

Optoelectronic safety sensors, for example laser scanners or light grids, very reliably detect the presence of an object or person. Such safety sensors are in very widespread use in the safeguarding of hazard areas of machines and enable the implementation of very simple safety functions.

Machine movements are as a rule stopped or slowed on a detection of an object relevant to safety. What object it is remains out of consideration in this process. This information is generally also not available at all or is not usable for safety engineering purposes.

A simple detection function of existing safety sensors permits a reliable safeguarding of hazard areas, but as a rule has negative effects on a productivity of a machine. Independently of a class of the detected object, for example of a person, an article, or a disturbance or disturbing articles, A shutdown is necessary for safety relevant reasons even if this response would not be necessary in certain cases.

In particular safe knowledge that a detected object is a person or not would enable a very much more specific monitoring of a potentially hazardous machine.

An autonomous vehicle, for example, will have to act very carefully when it detects the presence of a person in the travel path since in this case no information on the future behavior of the person is present. If the object is, however, another vehicle, there is no risk of endangering a person and the vehicle does not have to plan for any unforeseen behavior. Operating parameters can be optimized with respect to productivity in this case.

DE 10 2016 217 531 A1, for example, discloses a method of improving road safety, in particular of vulnerable road traffic users. In this respect, a radio measurement is carried out by means of ultra-wideband (UWB) radio technology between at least one radio station of a vehicle and a mobile radio station of a road user.

SUMMARY

An object of the invention comprises enabling a safe distinction of humans and objects. High quality safety functions such as the direct interaction between a human and a robot or between a human and mobile robots can thus be implemented.

The object is satisfied by a safety system for localizing a person or an object having a control and evaluation unit, having at least one radio location system, and having at least one spatially resolving sensor for the position determination of the person or object, wherein the radio location system has arranged radio stations, wherein at least one radio transponder is arranged at the person or object, wherein position data and classification data of the person or object can be determined by means of the radio location system, and wherein the position data and the classification data can be transmitted from the radio station of the radio location system to the control and evaluation unit and position data and contour data of the person or object can be determined by means of the spatially resolving sensor, and wherein the control and evaluation unit is configured to compare the position data of the radio location system and the position data of the sensor and to form tested position data on an agreement, wherein the control and evaluation unit is configured to compare the classification data of the radio station with the contour data of the spatially resolving sensor and to check for plausibility.

The object is further satisfied by a method of localizing a person or an object having a control and evaluation unit, having at least one radio location system, and having at least one spatially resolving sensor for the position determination of the person or object, wherein the radio location system has arranged radio stations, wherein at least one radio transponder is arranged at the person or object, wherein position data and classification data of the person or object are determined by means of the radio location system, and wherein the position data and the classification data are transmitted from the radio station of the radio location system to the control and evaluation unit and position data and contour data of the person or of the object are determined by means of the spatially resolving sensor, and wherein the control and evaluation unit compares the position data of the radio location system and the position data of the sensor and forms tested position data on an agreement, wherein the control and evaluation unit compares the classification data of the radio station with the contour data of the spatially resolving sensor and checks for plausibility.

The radio location system enables the classification of persons or objects in a favorable and simple manner. In accordance with the invention, an evaluation can take place at higher semantic levels. It is thus possible, for example, to predict and validate different behavioral patterns. This can take place using simple rules and standards. A deliberate control, namely an assignment of work tasks, is then even possible above the behavioral planes.

The safety system is at least formed by the control and evaluation unit , the radio location system, and the spatially resolving sensor.

The spatially resolving sensor and the radio location system measure the angle or the direction toward the person or object and the distance from the person or object. The spatially resolving sensor can thus also be called a location sensor.

The control and evaluation unit has inputs, a processing unit, and outputs. The spatially resolving sensor and the radio stations are connected to the inputs. The control and evaluation unit can be a modular control and evaluation unit that is programmable via software.

The outputs of the safety control and evaluation unit can in particular be redundant safety outputs. They are here, for example, semiconductor-controlled switching outputs to safely shut down a drive of a machine, for example.

The invention is based on the fact that a position of the person or object can be unambiguously identified by two mutually independent features. These features are the position that is determined via the spatially resolving sensor and the position that is determined via the radio location system. The position is thus determined by a redundant, in particular diverse, system.

The invention uses the combination of two diverse sensor technologies that mutually validate one another with respect to the detection data and classification data.

The first of the two sensor technologies is the radio location system or a radio based localization system by which the positions of radio transponders can be determined exactly to within a few centimeters. The radio location system also delivers classification information in addition to the position of the object or person with the aid of a radio transponder identification and a reference to an object or person stored thereon.

This system does not have to be developed and certified in the sense of functional safety, but can rather be co-used for a safety application as part of anyway used automation or logistics functions.

The radio location is, here, for example, based on a triangulation of at least one radio transponder at the person or with the object. At least three radio stations that can detect the radio transponder are required for this purpose. The distance between the respective radio stations is known to the radio location system here.

It is preferably a real time location system (RTLS). The radio transponder or radio transponders is/are here arranged at the person or at the object. The radio stations receive the radio signals from the radio transponders and can thus determine their position and so the position the person or of the object.

In this respect, position data are transmitted from the radio location system, namely the radio stations, to the control and evaluation unit.

The radio location system can also be radio frequencies of radio networks such as wireless LAN or WiFi. A 2.4 GHz or a 5 GHz band is, for example, used at a bandwidth of 20 MHz or 40 MHz.

The radio location system can also be radio frequencies of radio networks such as Bluetooth. Radio frequencies of 2.402 and 2.480 GHz are used here. The advantage of these frequencies is that they may be operated worldwide without a license. Ranges from 0 to 100 m can be reached depending on the power used. The ranges and the associated maximum powers are divided into classes 1 to 3

The second system is the spatially resolving sensor or a spatially resolving environment detection system. No tag is required for the localization here. No direct classification information is thus accessible to the spatially resolving sensor. This environment detection system or the spatially resolving sensor therefore delivers information that an object is located at a specific position and determines its position and dimensions or contour.

The two diverse part systems, namely the radio location system and the spatially resolving sensor, complement one another very well with respect to the functional tasks of position detection and classification and can therefore be mutually combined for validation and so for a technical safety use.

A validation of an object or person classification and of an object or person position could therefore schematically run as follows:

The radio location system determines the position of an object or person, with the object being identified via the radio transponder. This information is transmitted to the control and evaluation unit.

The control and evaluation unit optionally transmits a search field in which the radio location system has located the person or object to the spatially resolving sensor.

The spatially resolving sensor checks whether a person or object of a suitable size and optionally of other validation parameters such as shape, speed, etc. is detected in its detection zone or its search field. The spatially resolving sensor transmits the detected data to the control and evaluation unit.

The control and evaluation unit compares the detected features or contour of the person or object of the spatially resolving sensor with the detected features or contour of the person or object of the radio location system.

In addition, the detected position of the person or object of the radio location system and the detected position of the person or object of the spatially resolving sensor are compared with one another.

Both the person classification or object classification and the person position or object position can thus be mutually validated by the two diverse information channels and can thus be checked for a safety technical application.

In accordance with the invention, the radio transponder includes the classification information for the person or object, whereby the person or object is unambiguously identifiable.

The invention enables a safe classification of persons or objects in a monitored zone and thus opens up the option of tailoring a safety function specifically to a respective situation. There is thus the possibility of satisfying a demand for risk reduction without impairing a productivity of an automation process.

An existing infrastructure can frequently be used. Radio location systems are used In an industrial environment, but also in the public area, e.g. in hospitals, for example to locate driverless transport vehicles.

A classification of persons or objects requires little calculation effort in accordance with the invention. The sensor system is inexpensive and frequently even existing infrastructure can be used. In addition, the classification does not cause any disadvantageous latency times, which is a very big advantage for industrial safety engineering. The invention can also be advantageously used for human-robot collaboration in which persons have to act in direct proximity to the hazard site.

The physical principles of action and their strengths and weaknesses of the diverse sensors are advantageously complementary. Radio location systems, for example, have a natural immunity to extraneous light due to the principle of action. Radio location systems are furthermore less sensitive to interfering objects such as dust, chips, or mist. In addition, it becomes possible by radio location systems to see through non-metallic walls so that a particularly early recognition of persons or objects is possible. This permits a high quality optimization of processes with a constant ensuring of occupational safety.

The object can be stationary or mobile articles. The object is, for example, transport material or processing material.

In a further development of the invention, the spatially resolving sensor and the radio stations are arranged as stationary or as mobile at a movable machine.

The movable machine or mobile machine can, for example, be a guideless vehicle, a driverless vehicle, an automated guided vehicle (AGV), an automated mobile robot (AMR), an industrial mobile robot (IMR), or a robot having movable robot arms. The movable machine thus has a drive and can be moved in different directions.

The spatially resolving sensor is, for example, arranged at the front side of a vehicle to detect information from the environment. A plurality of spatially resolving sensors can also be arranged, in particular at the corners of the vehicle.

The vehicle can thereby detect its own position on the basis of recognized contours or a recognized position of the environment. An orientation takes place, for example, starting from a known initial point or starting point of the movable machine and is then continuously updated using detected environmental positions.

The control and evaluation unit is in this case likewise arranged at the movable machine and is connected to the spatially resolving sensor.

The outputs of the control and evaluation are connected to functional units such as the drive, the brakes, and/or the steering of the movable machine.

The stationary arrangement can be an arrangement at a machine, at a conveying path, at a passage, or similar.

In a further development of the invention, the radio location system is an ultrawide band radio location system, with the frequency used being in the range from 3.1 GHz to 10.6 GHz, with the transmission energy per radio station amounting to a maximum of 0.5 mW.

An absolute bandwidth in an ultrawide band radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves having a low energy. The system can be used very flexibly and has no interference.

At a minimum only one single radio transponder has to be arranged at the person or object, said radio transponder being detected by at least three radio stations arranged as stationary, with the spacing of the radio stations being known.

A plurality of radio stations, for example more than three, are preferably arranged that monitor at least some of the movement zone of the person or of the object.

At least two or more radio transponders can also be arranged at the person or object. The position of the person or object can thereby be identified more exactly and the alignment of the person or object in the stationary state can also be detected when the arrangement of the radio transponders at the person or object is known.

In a further development of the invention, the spatially resolving sensor is an optoelectronic sensor, an ultrasound sensor, or a radar sensor.

With a time of flight sensor, the light that is transmitted by a light transmitter and that is remitted by the person or object is received by a light receiver and the time of flight from the transmission from the person or object to the transmission is evaluated, whereby the distance from the person or object can be determined.

The sensor can, however, also be an ultrasound sensor or a radar sensor.

An ultrasound sensor transmits ultrasound and evaluates the reflected sound waves, that is the echo signals. Frequencies from 16 kHz onward are used here. Detection ranges from a few centimeters to a number of meters can be implemented here.

A radar sensor is a sensor that transmits a so-called primary signal as a bundled electromagnetic wave that receives echoes reflected from persons or objects as a secondary signal and evaluates it according to different criteria. This is a localization, namely the determination of distance and angle.

Position information or the position can be acquired from the received waves reflected from the person or object. As already mentioned the angle or the direction of the object and the distance from the person or object can be determined from the time shift between the transmission and reception of the signal. The relative movement between the transmitter and the person or object can furthermore also be determined, for example by a simple multiple measurement at time intervals. The arrangement of individual measurements after one another delivers the distance and the absolute speed of the object. Contours of the person or object can be recognized with a corresponding resolution of the radar sensor.

An irradiation from the radar sensor takes place, for example, largely bundled in one direction due to the antenna design. The radiation characteristics of the antenna then has a so-called lobe shape.

The wavelength of the radar is in the range of the radio waves in the short wave to microwave range. A pulse radar sensor transmits pulses having a typical duration in the lower microsecond range and then waits for echoes. The transit time of the pulse is the time between the transmission and the reception of the echo. It is used for distance determination.

A direction of the scanning beam of a pulse radar sensor can also be effected electronically by phase-controlled antenna arrays instead of by the alignment of the antenna or antennas. A plurality of objects can be targeted and almost simultaneously tracked in a fast alternating manner by this.

The radar sensor works at a power of approximately 10 mW, for example. This power is so low that there are no health effects. The radar frequency licensed for this application is, for example, in the range from 76-77 GHz, corresponding to a wavelength of approximately 4 mm.

In a further development of the invention, the spatially resolving sensor is configured for the at least areal monitoring of a monitored zone.

The spatially resolving sensor for the at least areal monitoring of a monitored zone is a sensor for distance measurement. The distance sensor delivers distance values in at least two-dimensional space. In so doing, the sensor outputs measured values with distance indications and angle indications. For example, the distance is determined by means of time of flight methods or triangulation methods.

In a further development of the invention, the spatially resolving sensor is configured for the at least spatial monitoring of a monitored zone.

In a further development of the invention, the spatially resolving optoelectronic sensor is a laser scanner, a safety laser scanner, a 3D camera, a stereo camera, or a time of flight camera.

The laser scanner, the safety laser scanner, the 3D camera, the stereo camera, or the time of flight camera monitors a two-dimensional or three-dimensional measured data contour of the person or object for the position detection. It can synonymously be a monitored field.

The laser scanner or the safety laser scanner, for example, monitors a measured data contour for the position detection.

Safety systems used in safety engineering have to work particularly reliably and inherently safely and must therefore satisfy high safety demands, for example the standard EN13849 for safety of machinery and the machinery standard EN61496 for electrosensitive protective equipment (ESPE).

To satisfy these safety standards, a series of measures have to be taken such as a secure electronic evaluation by redundant and/or diverse electronics or different functional monitoring processes, especially the monitoring of the contamination of optical components, including a front screen. A safety laser scanner in accordance with such standards is known, for example, from DE 43 40 756 A1.

The term "functionally safe" is to be understood in the sense of the standards named or of comparable standards; measures are therefore taken to control errors up to a specified safety level. The safety system can therefore be configured as intrinsically safe. The safety system and/or at least one unsafe sensor moreover generate unsafe data such as raw data, point clouds, or the like. Unsafe is the opposite of safe for unsafe devices, transmission paths, evaluations, and the like and accordingly said demands on fail safeness are not satisfied.

A 3D camera, for example, likewise monitors a monitored zone by means of a plurality of detected distance values. A 3D camera has the advantage that a volume-like protected zone can be monitored.

A stereo camera, for example, likewise monitors a monitored zone of means of a plurality of detected distance values. The distance values are determined on the basis of the two cameras of the stereo camera that are installed at a basic spacing from one another. A stereo camera equally has the advantage that a volume-like protected zone can be monitored.

Distance values on the basis of the measured time of flight that are determined by an image sensor are determined by means of a time of flight camera. A time of flight camera equally has the advantage that a volume-like or spatial protected zone can be monitored.

In a further development of the invention, a change of the safety function of the safety system takes place on the basis of the checked position data by means of the control and evaluation unit.

A change of the safety function of the safety system takes place on the basis of agreeing position data by means of the control and evaluation unit.

If both part systems, that is the spatially resolving sensor and the radio location system, deliver consistent positions that can be associated with one another, a predetermined position that is stored, for example, can be recognized and the control and evaluation unit can switch over to a different protective measure or safety function. The switching over of the protective measure can comprise, for example, a switching over from measured data contours, a switching over from protected fields, a parameter or shape matching of measured data contours or protected fields, and/or a switching over of the properties of a protected field. The properties of a protected field include, for example, the resolution and/or the response time of the protected field. A switching over of the protective measure can also be a safety function such as a force restriction of the drive to which the switchover is made.

In a further development of the invention, the checked position data are checked for agreement with stored position data of a safe point of interest by means of the control and evaluation unit and if there is agreement, a change of the safety function of the safety system takes place.

The safe point of interest (SPOI) is a simplified variant of a safe positioning that is restricted to a detection of particular positions in an industrial application at which it is necessary to adapt the safety system or a protective device or a safety function of the movable machine to ensure both personal protection and machine availability. The safe point of interest is a synonymous name around a safety location, that is not a singular point.

In a further development of the invention, the safety system has a map or a map model, with the at least one safe point of interest being entered in the map or map model and a navigation of the movable machine taking place in the map or map model.

The current position and/or location of the movable machine is continuously processed in the control and evaluation unit on the basis of detected environmental contours and the map or map model is updated. The map has a coordinate system. This kind of position determination is called a simultaneous localization and mapping (SLAM) method. In this respect, at least one position and one associated orientation in the map are known or a position of origin and an orientation of origin in the map are known. Recognized positions and/or contours are continuously entered into the map, whereby the map is expanded or changes of, for example, objects and/or travel paths are entered into the map.

BRIEF DESCRIPTION OF THE DRAWINGS

The invention will also be explained in the following with respect to further advantages and features with reference to the enclosed drawing and to embodiments. The Figures of the drawing show in.

DETAILED DESCRIPTION

Figure 1:
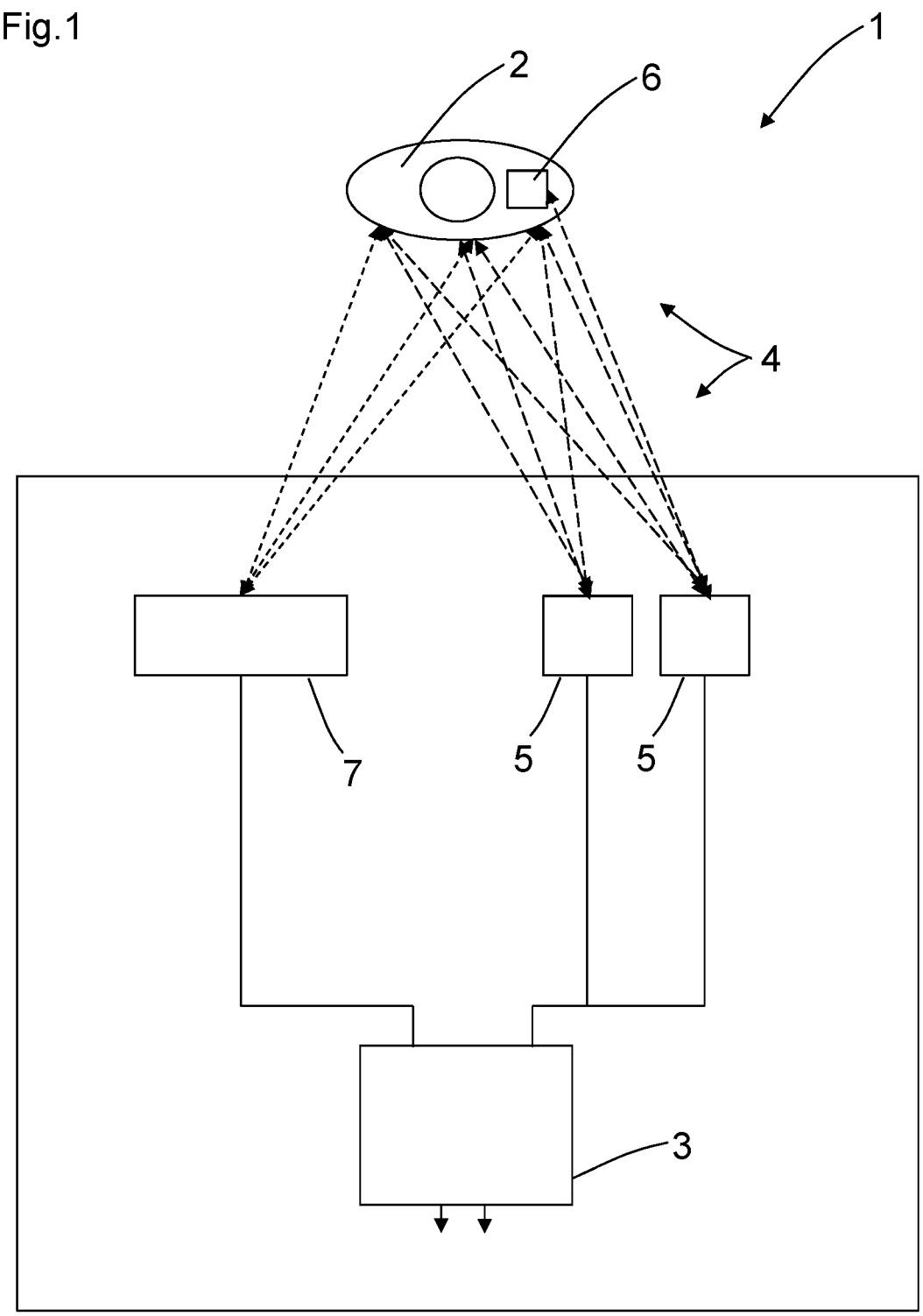
FIG. 1 a safety system for localizing a person.

In the following Figures, identical parts are provided with identical reference numerals.

FIG. 1 shows a safety system 1 for localizing a person 2 having a control and evaluation unit 3, having at least one radio location system 4, and having at least one spatially resolving sensor 7 for the position determination of the person 2, wherein the radio location system 4 has arranged radio stations 5, wherein at least one radio transponder 6 is arranged at the person 2, wherein position data and classification data of the person 2 can be determined by means of the radio location system, 4 and wherein the position data and the classification data can be transmitted from the radio station 5 of the radio location system 4 to the control and evaluation unit 3 and position data and contour data of the person 2 can be determined by means of the spatially resolving sensor 7, and wherein the control and evaluation unit 3 is configured to compare the position data of the radio location system 4 and the position data of the spatially resolving sensor 7 and to form tested position data on an agreement, wherein the classification data of the radio station 5 is checked for plausibility by means of the control and evaluation unit 3 by a comparison with the contour data of the spatially resolving sensor 7.

Figure 2:
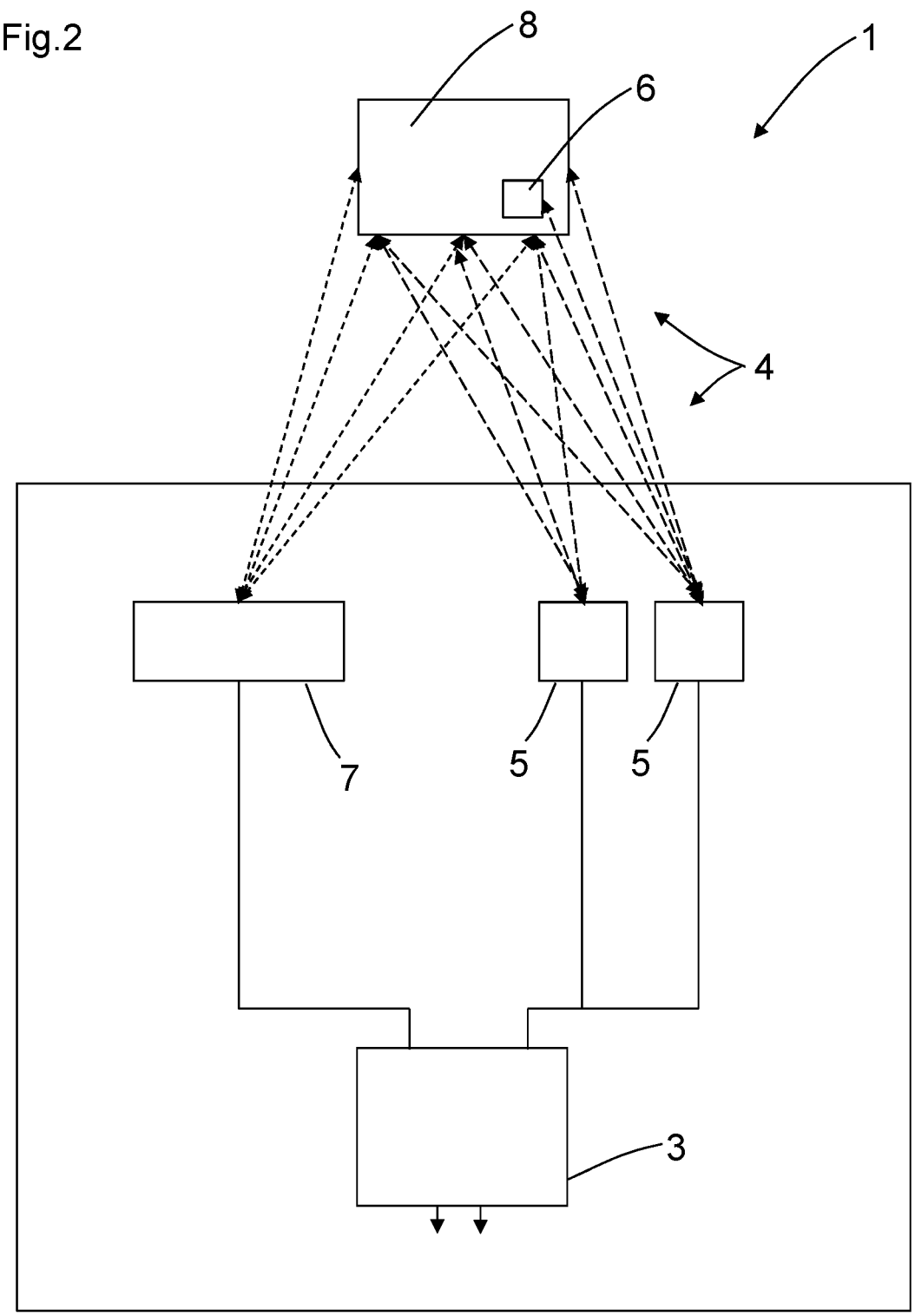
FIG. 2 a safety system for localizing an object.

Analog to FIG. 1, FIG. 2 shows a safety system for localizing an object 8 having a control and evaluation unit 3, having at least one radio location system 4, having at least one spatially resolving sensor 7 for the position determination of the object 8, wherein the radio location system 4 has arranged radio stations 5. A radio transponder 6 is arranged at the object.

The safety system 1 is at least formed by the control and evaluation unit 3, the radio location system, 4 and the spatially resolving sensor 7.

The spatially resolving sensor 7 and the radio location system 4 measure the angle or the direction toward the person 2 or object 8 and the distance from the person 2 or object 8.

The control and evaluation unit 3 has inputs, a processing unit, and outputs. The spatially resolving sensor 7 and the radio stations 5 are connected to the inputs.

The outputs of the safety control and evaluation unit 3 can in particular be redundant safety outputs. They are here, for example, semiconductor-controlled switching outputs to safely shut down a drive of a machine, for example.

The invention uses the combination of two diverse sensor technologies that mutually validate one another with respect to the detection work and classification work.

The first of the two sensor technologies is the radio location system 4 or a radio based localization system by which the positions of radio transponders 6 can be determined exactly to within a few centimeters. The radio location system 4 also delivers classification information in addition to the position of the object 8 or person 2 with the aid of a radio transponder identification and a reference to an object 8 or person 2 stored thereon.

The radio location is, here, for example, based on a triangulation of at least one radio transponder 6 at the person 2 or object 8. At least three radio stations 5 that can detect the radio transponder 6 are required for this purpose. The distance between the respective radio stations 5 is known to the radio location system 4 here.

It is preferably a real time location system (RTLS). The radio transponder or radio transponders 6 is/are here arranged at the person 2 or object 8. The radio stations 5 receive the radio signals from the radio transponders 6 and can thus determine their position and so the position of the person 2 or object 8

In this respect, position data are transmitted from the radio location system 4, namely the radio stations 5, to the control and evaluation unit 3.

The second system is the spatially resolving sensor 7 or a spatially resolving environment detection system. No radio transponder or tag is required for the localization here. This environment detection system or the spatially resolving sensor 7 therefore delivers information that an object 8 is located at a specific position and determines its position and dimensions or contour.

The two diverse part systems, namely the radio location system 4 and the spatially resolving sensor, 7 complement one another very well with respect to the functional tasks of position detection and classification and can therefore be mutually combined for validation and so for a technical safety use.

A validation of an object classification or person classification and of an object position or person position could therefore schematically run as follows in accordance with FIG. 1 or FIG. 2:

The radio location system 4 determines the position of an object 8 or person 2, with the object 8 or person 2 being identified via the radio transponder 6. This information is transmitted to the control and evaluation unit 3.

The control and evaluation unit 3 optionally transmits a search field in which the radio location system 4 has located the person 2 or object 8 at the spatially resolving sensor 7.

The spatially resolving sensor 7 checks whether a person 2 or object 8 of a suitable size and optionally of other validation parameters such as shape, speed, etc. is detected in its detection zone or its search field. The spatially resolving sensor 7 transmits the detected data to the control and evaluation unit 3.

The control and evaluation unit 3 compares the detected features or contour of the person 2 or object of 8 the spatially resolving sensor 7 with the detected features or contour of the person 2 or object 8 of the radio location system 4.

In addition, the detected position of the person 2 or of the object 8 of the radio location system 4 and the detected position of the person 2 or object 8 of the spatially resolving sensor 7 are compared with one another.

Both the person classification or object classification and the person position or object position can thus be mutually validated by the two diverse information channels and can thus be checked for a safety technical application.

In accordance with FIG. 1 or FIG. 2, the radio transponder 6 includes the classification information for the person 2 or object 8, whereby the person 2 or object 8 is unambiguously identifiable.

In accordance with FIG. 2, the spatially resolving sensor 7 and the radio stations 5 are, for example, arranged as stationary at a conveyor belt.

Figure 3:
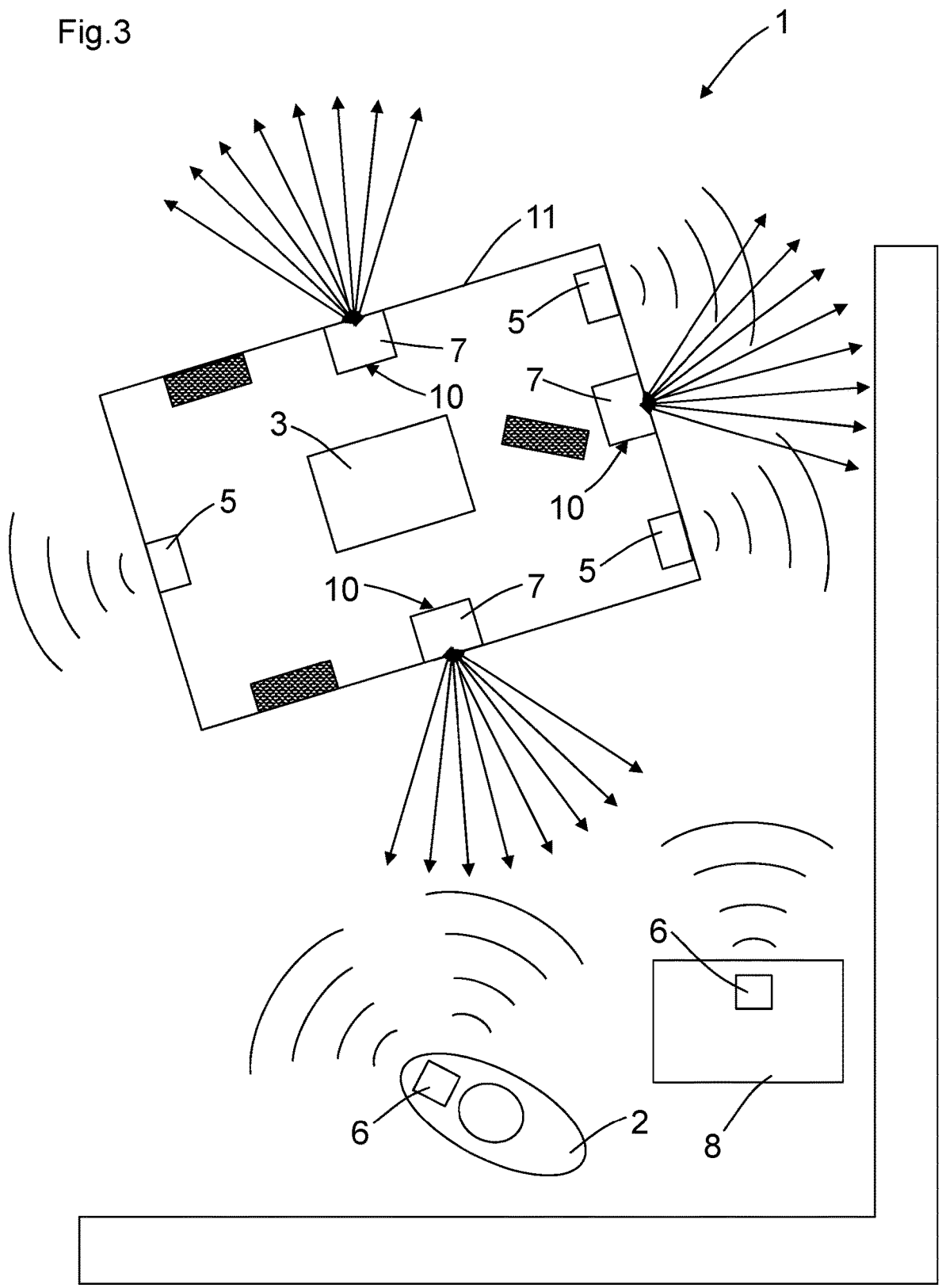
FIG. 3 a mobile safety system for localizing a person or object.

FIG. 3 shows a mobile safety system 1 for localizing a person 2 or object 8. In accordance with FIG. 3, the spatially resolving sensor 7 and the radio stations 5 are arranged as mobile at a movable machine 11.

The movable machine 11 or mobile machine can, for example, be a guideless vehicle, a driverless vehicle, an automated guided vehicle (AGV), an automated mobile robot (AMR), an industrial mobile robot (IMR), or a robot having movable robot arms. The movable machine 11 thus has a drive and can be moved in different directions.

The spatially resolving sensor 7 is, for example, arranged at the front side of a vehicle to detect information from the environment. A plurality of spatially resolving sensors 7 can also be arranged, in particular at the corners of the vehicle.

The vehicle can thereby detect its own position on the basis of recognized contours or a recognized position of the environment. An orientation takes place, for example, starting from a known initial point or starting point of the movable machine 11 and is then continuously updated using detected environmental positions.

The control and evaluation unit 3 is in this case likewise arranged at the movable machine 11 and is connected to the spatially resolving sensor 7.

The outputs of the control and evaluation 3 are connected to functional units such as the drive, the brakes, and/or the steering of the movable machine 11

In accordance with FIG. 3, the radio location system 4 is an ultrawide band radio location system, with the frequency used being in the range from 3.1 GHz to 10.6 GHz, with the transmission energy per radio station amounting to a maximum of 0.5 mW.

At a minimum only one single radio transponder 6 has to be arranged at the person 2 or object 8, said radio transponder 6 being detected by at least three arranged radio stations 5, with the spacing of the radio stations 5 being known.

A plurality of radio stations 5, for example more than three, are preferably arranged that monitor at least some of the movement zone of the person 2 or object 8.

At least two or more radio transponders 6 can also be arranged at the person 2 or object 8. The position of the person 2 or object 8 can thereby be identified more exactly and the alignment of the person 2 or object 8 in the stationary state can also be detected when the arrangement of the radio transponders 6 at the person 2 or object 8 is known.

In accordance with FIG. 3, the spatially resolving sensor 7 is an optoelectronic sensor, in particular a laser scanner 10. The spatially resolving sensor 7 is thus configured for the at least areal monitoring of a monitored zone.

The laser scanner 10 delivers distance values in at least two-dimensional space. In so doing, the sensor outputs measured values with distance indications and angle indications. For example, the distance is determined by means of time of flight methods. The laser scanner 10 or the safety laser scanner, for example, monitors a measured data contour for the position detection.

Optionally, a change of the safety function of the safety system 1 takes place on the basis of the checked position data by means of the control and evaluation unit 3.

A change of the safety function of the safety system 1 takes place on the basis of agreeing position data by means of the control and evaluation unit 3.

If both part systems, that is the spatially resolving sensor 7 and the radio location system 4, deliver consistent positions that can be associated with one another, a predetermined position that is stored, for example, can be recognized and the control and evaluation unit 3 can switch over to a different protective measure or safety function. The switching over of the protective measure can comprise, for example, a switching over from measured data contours, a switching over from protected fields, a parameter or shape matching of measured data contours or protected fields, and/or a switching over of the properties of a protected field. The properties of a protected field include, for example, the resolution and/or the response time. A switching over of the protective measure can also be a safety function such as a force restriction of the drive to which the switchover is made.

Position data checked by means of the control and evaluation unit 3 are optionally checked for agreement with stored position data of a safe point of interest and if there is agreement, a change of the safety function of the safety system 1 takes place.

Figure 4:
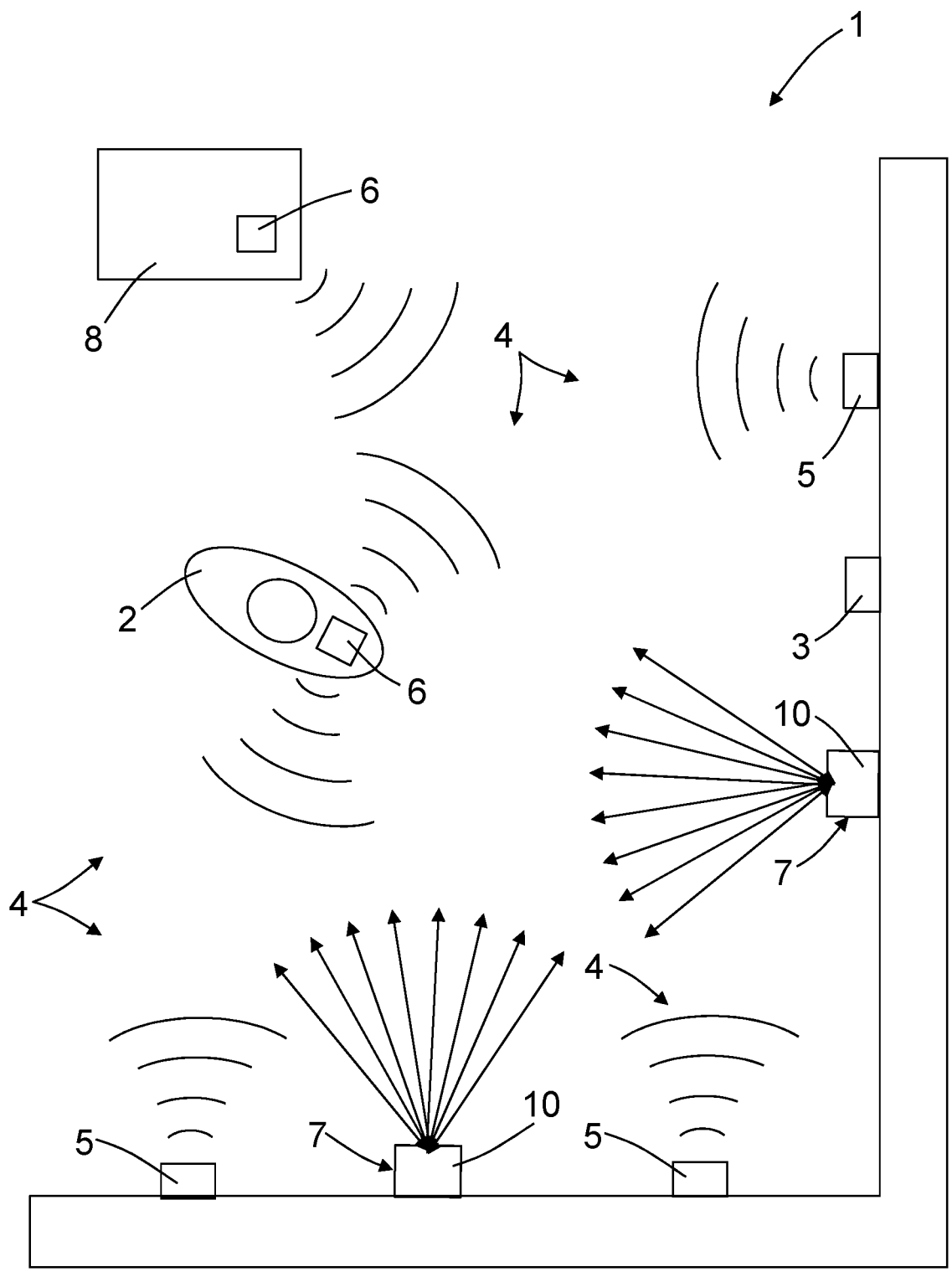
FIG. 4 a stationary safety system for localizing a person or object.

In accordance with FIG. 4, the radio stations 5 and the spatially resolving sensor 7 are arranged as stationary. A radio transponder 6 is arranged at the person 2. A further radio transponder 6 is arranged at an object 8.

Figure 5:
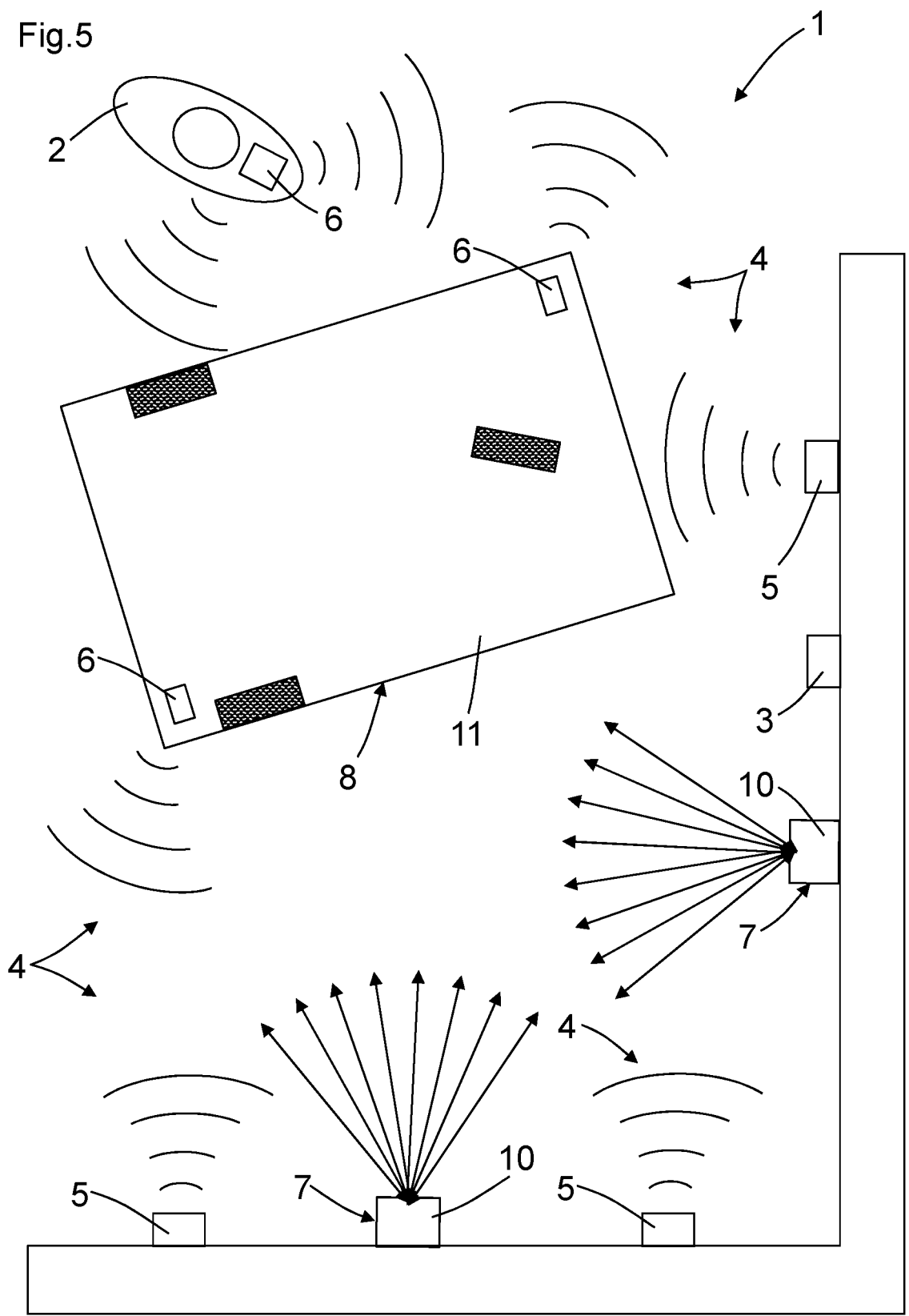
FIG. 5 a stationary safety system for localizing a person or object.

FIG. 5 shows a stationary safety system 1 for localizing a person 2 or object 8. In accordance with FIG. 5, the radio stations 5 and the spatially resolving sensor 7 are arranged as stationary. Two radio transponders 6 are arranged at a mobile vehicle.

REFERENCE NUMERALS 1 safety system
2 person
3 control and evaluation unit
4 radio location system
5 radio stations
6 radio transponder
7 spatially resolving sensor
8 object
10 laser scanner
11 movable machine

The invention claimed is:

1. A safety system for localizing one of a person and an object, the safety system comprising:
   a control and evaluation unit;
   at least one radio location system; and
   at least one spatially resolving sensor for the position determination of the person or of the object,
   wherein the radio location system has arranged radio stations;
   wherein at least one radio transponder is arranged at the person or the object;
   wherein position data and classification data of the person or object can be determined by means of the radio location system;
   wherein the position data and the classification data can be transmitted from the radio station of the radio location system to the control and evaluation unit,
   wherein position data and contour data of the person or of the object can be determined by means of the spatially resolving sensor,
   wherein the control and evaluation unit is configured to compare the position data of the radio location system and the position data of the sensor and to form checked position data on an agreement, with the control and evaluation unit being configured to compare the classification data of the radio station with the contour data of the spatially resolving sensor and to check for plausibility, and
   wherein the radio location system is an ultrawide band radio location system, with the frequency used being in the range from 3.1 GHz to 10.6 GHz, with the transmission energy per radiation station amounting to a maximum of 0.5 mW.

2. The safety system in accordance with claim 1, wherein the spatially resolving sensor and the radio stations are arranged as stationary or are arranged as mobile at a movable machine.

3. The safety system in accordance with claim 1, wherein the spatially resolving sensor is one of an optoelectronic sensor, an ultrasonic sensor, and a radio sensor.

4. The safety system in accordance with claim 1, wherein the spatially resolving sensor is configured for an at least areal monitoring of a monitored zone.

5. The safety system in accordance with claim 1, wherein the spatially resolving sensor is configured for an least spatial monitoring of a monitored zone.

6. The safety system in accordance with claim 1, wherein the sensor is one of a laser scanner, a safety laser scanner, a 3D camera, a stereo camera, and a time of flight camera.

7. The safety system in accordance with claim 1, wherein a change of a safety function of the safety system takes place by means of the control and evaluation unit based on the checked position data.

8. The safety system in accordance with claim 1, wherein position data checked by means of the control and evaluation unit controller are checked for agreement with stored position data of a safe point of interest and if there is agreement, a change of a safety function of the safety system takes place.

9. The safety system in accordance with claim 8, wherein the safety system has one of a map and a map model, with the at least one safe point of interest being entered in the map or map model and a navigation of the movable machine taking place in the map or map model.

10. A method of localizing one of a person and an object, wherein a control and evaluation unit, at least one radio location system, and at least one spatially resolving sensor for the position determination of the person or the object are provided,
   wherein the radio location system has arranged radio stations;

wherein at least one radio transponder is arranged at the person or the object;

wherein position data and classification data of the person or the object are determined by means of the radio location system;

wherein the position data and the classification data are transmitted from the radio station of the radio location system to the control and evaluation unit, position data and contour data of the person or the object are determined by means of the spatially resolving sensor, wherein the control and evaluation unit compares the position data of the radio location system and the position data of the sensor and forms checked position data on an agreement, with the control and evaluation unit comparing the classification data of the radio location system with the contour data of the spatially resolving sensor and checking for plausibility, and wherein the radio location system is an ultrawide band radio location system, with the frequency used being in the range from 3.1 GHz to 10.6 GHz, with the transmission energy per radiation station amounting to a maximum of 0.5 mW.

\* \* \* \* \*